Patented June 23, 1942

2,287,443

UNITED STATES PATENT OFFICE 2,287,443

OCTYL-HALO-PHENOLS

Lindley E. Mills, Midland, Mich., assignor to The Dow Chemical Company, Midland, Mich., a corporation of Michigan No Drawing. Application March 28, 1940, Serial No. 326,471

7 Claims. (Cl. 260—623)

The present invention relates to octyl-halophenols and is particularly concerned with those compounds having the following structural formula:

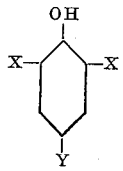

wherein one X represents halogen, the other X represents halogen or hydrogen, and Y represents a tertiary-octyl radical. These compounds are viscous, water-white liquids or low melting solids substantially insoluble in water, but somewhat soluble in most common organic solvents. They may be advantageously employed as antiseptics, germicides, or bactericides or as intermediates in the preparation of more complex organic derivatives.

The foregoing compounds may be prepared by contacting 4-tertiary-octyl phenol with a halogen. While such direct halogenation may be carried out under any suitable reaction conditions, it is generally preferred to warm the tertiary-octyl phenol to its melting temperature and thereafter to introduce the halogen as a gas on or below the surface of the liquid phenol. If desired, a solvent may be employed for the phenol or the halogen, or both, whereby the halogenation may be carried out conveniently at temperatures below the melting temperature of 4-tertiary-octyl phenol. Such solvent should be relatively inert and not reacted upon by the halogen since the hydrogen halide formed in the reaction is collected and measured to determine the extent to which halogen has been substituted in the benzene nucleus. Among the solvents which may be so employed are carbon tetrachloride and ethylene chloride. When the amount of hydrogen halide given off indicates the completion of the reaction, the crude product is fractionally distilled to separate the tertiary-octyl-mono-halo-phenol from the di-halo derivatives formed in the reaction. By operating at reduced pressures this fractionation can be carried out so as to separate the 4-tertiary-octyl mono- and di-halo phenols in substantially pure form.

The following examples set forth certain embodiments of the invention, but are not to be construed as limiting the same.

Example 1

200 grams (0.97 mole) of 4-tertiary-octyl-phenol, freezing at 85° C., was heated to 90° C. and gaseous chlorine slowly introduced below the surface of the molten phenol until 0.97 mole of hydrogen chloride was evolved. The temperature of the reaction mixture rose to 110° C. during the early stages of the chlorination and thereafter slowly dropped to 60° C. After all the chlorine had been added, the warm product was blown with air to remove residual hydrogen chloride and thereafter fractionally distilled whereby there was obtained 181.5 grams of 2-chloro-4-tertiary-octyl phenol boiling at 145°–150° C. at 5–6 mm. pressure. This product was a viscous liquid having a specific gravity of 1.055 at 25°/25° C. and containing 15.0 per cent by weight of chlorine.

Example 2

As a secondary product of the reaction described in the foregoing example, there was obtained 2,6-dichloro-4-tertiary-octyl phenol as a viscous liquid boiling at 145°–146° C. at 3–4 mm. pressure and having a specific gravity of 1.138 at 25°/25° C. After standing for several months at a temperature of 5°–10° C., this compound solidified to form white crystals melting at 39°–40° C.

Example 3

2-bromo-4-tertiary-octyl phenol was prepared substantially as described in Example 1 by substituting bromine for the chlorine employed as a reactant therein. This compound was a viscous liquid boiling at approximately 140° C. at 3–5 mm. pressure and having a specific gravity of 1.17 at 25°/25° C.

Example 4

343 grams (1.22 moles) of the 2-bromo-4-tertiary-octyl phenol described above was reacted with 195 grams (1.22 moles) of bromine. The bromine was added to the phenol portion-wise over a period of approximately one hour, the reaction mixture being maintained at a temperature of between 80° and 100° C. After all the bromine had been added, the mixture was blown with air to remove hydrogen bromide and fractionally distilled to obtain 324.5 grams of 2,6-dibromo-4-tertiary-octyl phenol as a thick viscous liquid boiling at 158°–163° C. at 3–6 mm. pressure and having a specific gravity of 1.455 at 25°/25° C. The phenol coefficient of 2,6-di-bromo-4-tertiary-octyl phenol is 8.0 against E. typhi.

Other 4-tertiary-octyl-, mono-, and di-halo-phenols may also be prepared, such as 2-iodo-4-tertiary-octyl phenol and 2-bromo-6-chloro-4-tertiary-octyl-phenol.

The phenol coefficient as set forth above was determined according to the method developed by the United States Public Health Service Hygienic Laboratories and reported in Circular No. 198 of the Food and Drug Administration, United States Department of Agriculture. The reported value is based upon a coefficient of 1.0 for phenol.

This application is a continuation-in-part of co-pending application Serial No. 750,598, filed October 29, 1934.

Other modes of applying the principle of my invention may be employed instead of those explained, change being made as regards the materials employed provided the products set forth in the following claims be thereby obtained.

I therefore particularly point out and distinctly claim as my invention:

1. A tertiary-octyl-halo-phenol having the following structural formula:

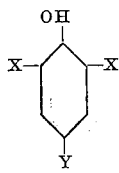

wherein one X represents halogen, the other X represents a member of the group consisting of halogen and hydrogen, and Y represents a tertiary-octyl radical.

2. A tertiary-octyl-chloro-phenol having the following structural formula:

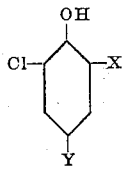

wherein X represents a member of the group consisting of chlorine and hydrogen, and Y represents a tertiary-octyl radical.

3. A tertiary-octyl-bromo-phenol having the following structural formula:

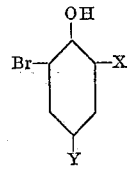

wherein X represents a member of the group consisting of bromine and hydrogen, and Y represents a tertiary-octyl radical.

4. A tertiary-octyl-mono-halo-phenol having the following structural formula:

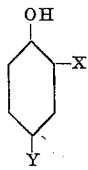

wherein X represents halogen, and Y represents a tertiary-octyl radical.

5. 2-chloro-4-tertiary-octyl-phenol.
6. 2-bromo-4-tertiary-octyl-phenol.
7. 2.6-di-bromo-4-tertiary-octyl-phenol.

LINDLEY E. MILLS.